United States Patent [19]
Ito et al.

[11] Patent Number: 5,662,368
[45] Date of Patent: Sep. 2, 1997

[54] AUTOMOBILE SEAT

[75] Inventors: Sadao Ito, Anjyo; Toshimitsu Araki, Toyota, both of Japan

[73] Assignees: Aisin Seiki Kabushiki Kaisha, Kariya; Toyota Jidosha Kabushiki Kaisha, Toyota, both of Japan

[21] Appl. No.: 668,161

[22] Filed: Jun. 21, 1996

[30]     Foreign Application Priority Data

Jun. 22, 1995  [JP]  Japan .................................. 7-156340

[51] Int. Cl.⁶ ...................................................... B60N 2/10
[52] U.S. Cl. ...................... 296/65.1; 297/336; 248/503.1; 292/116; 292/213
[58] Field of Search ............................ 296/65.1; 297/331, 297/335, 336; 292/116, 117, 213; 248/503.1

[56]              References Cited

U.S. PATENT DOCUMENTS

| 917,448 | 4/1909 | Johnson | 292/117 |
|---|---|---|---|
| 4,736,985 | 4/1988 | Fourrey et al. | 297/331 |
| 4,925,229 | 5/1990 | Siebler | 296/65.1 |
| 5,393,116 | 2/1995 | Bolsworth et al. | 296/65.1 |
| 5,593,208 | 1/1997 | Mitschelen et al. | 296/65.1 X |

FOREIGN PATENT DOCUMENTS

| 59-17697 | 5/1984 | Japan . |
|---|---|---|
| 4-28128 | 3/1992 | Japan . |
| 4-28129 | 3/1992 | Japan . |
| 5-28101 | 7/1993 | Japan . |
| 5-41061 | 10/1993 | Japan . |
| 6-9888 | 3/1994 | Japan . |
| 6-50963 | 7/1994 | Japan . |

*Primary Examiner*—Dennis H. Pedder
*Attorney, Agent, or Firm*—Burns, Doane, Swecker & Mathis, LLP

[57]              ABSTRACT

The present invention provides a second lock mechanism (5) which interlocks a seat (1) with a rotating member (45) and renders the rotating member (45) non-rotatable with respect to the seat (1), and when the seat (1) is reclined the first lock mechanism (5) and the vehicle floor (2) are interlocked and rotation of the rotating member (45) with respect to the seat (1) is regulated, while when in a folded-up state, rotation of the seat (1) with respect to the vehicle floor (2) by an axle mechanism (44) is regulated by rotation control of the rotating member (45) with respect to the seat (1) by means of the interlocking of the second lock mechanism (5) and the seat (1), via a linkage mechanism (49), thus achieving a significant improvement in the usability of an automobile seat when adjusting it to a seating position or a folded-up position.

6 Claims, 4 Drawing Sheets

1

AUTOMOBILE SEAT

BACKGROUND OF THE INVENTION

The present invention relates to an automobile seat, particularly to a collapsible seat which can increase load space.

In order to keep a large space adequate to accommodate a heavy load in a vehicle or to provide an easy entry seat arrangement, a seat back is folded forwardly onto a seat cushion and then the seat back folding seat is often collapsed or forwardly tilted.

Conventionally, a seat of this type comprises an axle mechanism disposed between the seat and a floor of the vehicle for rotatably supporting the seat with respect to the vehicle floor, a rotating member rotatably supported on the seat, a lock mechanism disposed in the rotating member and attachable to or detachable from the vehicle floor, and a linkage mechanism disposed between the vehicle floor and the rotating member to rotate the rotating member with respect to the seat. In such a conventional device, in a state where a person is sitting in the seat the seat is arranged in a manner that the seat cushion is substantially parallel to the vehicle floor, and in addition, the rotating member is protruded from the seat. The lock mechanism and the vehicle floor is in an interlocking state, thereby restricting rotation of the seat by the axle mechanism with respect to the vehicle floor. In this state, by operating the lock mechanism to release the interlocking state of the lock mechanism and the vehicle floor and rotating the seat with respect to the vehicle floor, the seat is arranged so that the seat cushion is upright with respect to the vehicle floor and placed in a "folded-up" state. At this time the rotating member is rotated together with rotation of the seat due to the operation of the linkage mechanism and is arranged housed within the seat.

An example of the automobile seat of this type is disclosed in the specification of Japanese Utility Model Laid Open Publication (KOKAI) No. Hei6-50963 (1994).

However, with the above-described conventional device, in the folded-up state the seat is free to rotate in any way with respect to the vehicle floor. For this reason, an accessory such as a support rod or the like is required in order to maintain the seat in the folded-up state. As a result, the number of troublesome jobs for the user such as attaching and detaching the accessory when changing from a seating state to the folded-up state and vice versa etc. are requested and reducing usability.

Consequently, the present invention has its technical subject matter to improve the usability of the folding automobile seat when modifying it from a seating state to a folded-up state.

SUMMARY OF THE INVENTION

In order to solve the above technical subject matter, the technical means conceived of in the present invention are an axle mechanism disposed between the seat and a floor of the automobile for rotatably supporting the seat on the automobile floor, a rotating member rotatably supported in the seat, a first lock mechanism disposed in the rotating member and detachable from the automobile floor, a linkage mechanism disposed between the automobile floor and the rotating member and interlocking with rotation of the seat with respect to the automobile floor to rotate the rotating member with respect to the seat, and a second lock mechanism disposed in the rotating member and engaged with the seat, to render the rotating member non-rotatable with respect to the seat.

In further detail, the automobile seat may also have a latch having two notches attachable and detachable to and from a first striker fixed to the automobile floor and a second striker fixed to the seat, and the first lock mechanism and the second lock mechanism may be constructed in common.

According to the above technical means, when the seat is reclined, the first lock mechanism and the vehicle floor interlock and rotation of the rotating member with respect to the seat is controlled, and when the seat is raised, the second lock mechanism and the seat interlock rotation of the rotating member with respect to the seat is controlled. Thereby, rotation of the seat with respect to the vehicle floor by an axle mechanism in a folded-up state is regulated by rotation control of the rotating member with respect to the seat by means of the interlocking of the second lock mechanism and the seat, via a linkage mechanism. As a result, by merely rotating the seat, maintaining the seat in a folded-up state and a seating state is possible and usability is improved.

According to the present invention, since a second lock mechanism which interlocks the seat with the rotating member and disables rotation of the rotating member with respect to the seat is provided, rotation of the seat with respect to the vehicle floor by means of the axle mechanism in the folded-up state can be controlled by rotation control of the rotating member with respect to the seat by means of the interlocking of the second lock mechanism and the seat, via a linkage mechanism. Thereby, maintaining the seat in a folded-up state and a seating state is possible by merely rotating the seat, and usability can be improved. Also, since an accessory such as a support rod or the like is unnecessary, it can also be effective in terms of cost.

In addition, according to the present invention, since the first lock mechanism and the second lock mechanism are unified by a latch having two notched, compared to the prior art the present invention can be given a simple structure and its can be reduced without increasing the number of parts used therein.

BRIEF DESCRIPTION OF THE DRAWINGS

These and other features, aspects and advantages of the present invention will become better understood with reference to the following description, appended claims and accompanying drawings, wherein:

DETAILED DESCRIPTION OF THE INVENTION

Hereunder, an embodiment of the present invention will be explained based on the enclosed drawings.

Figure 1:
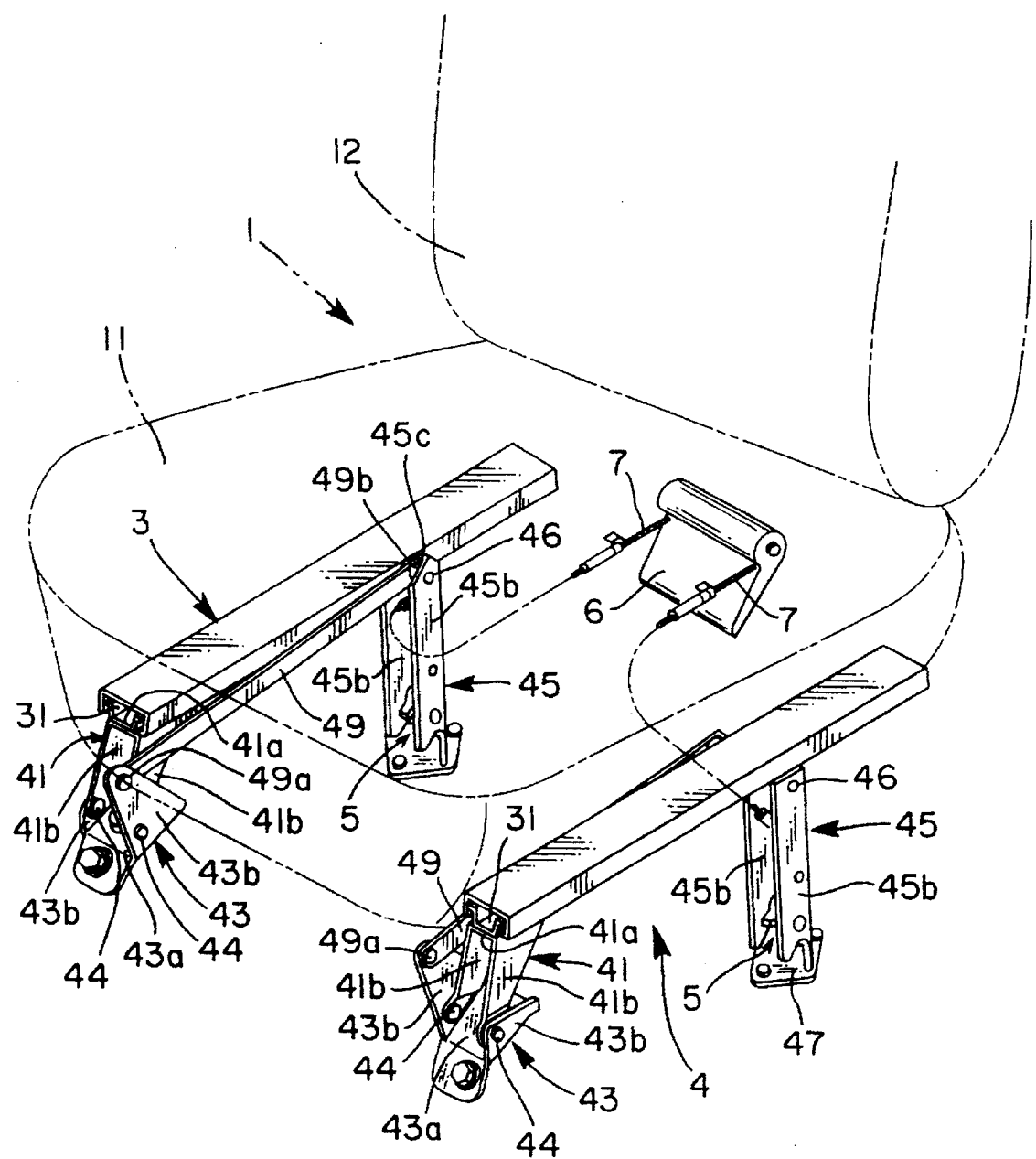
FIG. 1 is a perspective view of the automobile seat of the present invention.

As shown in FIG. 1, a seat 1 is formed by a seat cushion 11 upon which a driver or passenger sits and a seat back 12 which supports the back of the driver or passenger while sitting. The seat back 12 is arranged at the rear portion of the seat cushion 11, and is rotatably supported by the seat cushion 11 via an adjustable reclining mechanism (not shown) so that it can attain an upright position and a folded-up position with respect to the seat cushion 11. The seat 1 is slidably supported in the fore and aft directions of the vehicle with respect to the vehicle floor 2 (shown in FIGS. 3 and 4). Between the vehicle floor 2 and an adjustable slide mechanism 3, which makes the seat 1 capable of sliding with respect to the vehicle floor 2, a mechanism 4 for attaining a seating position of the arrangement of the seat 1 in which the seat cushion 11 is reclined horizontally with respect to the vehicle floor 2 (state shown in FIG. 3) and a folded-up position of the arrangement of the seat 1 in which the seat cushion 11 is upright with respect to the vehicle floor 2 (state shown in FIG. 4), is disposed.

This mechanism 4 will now be explained in detail.

Figure 2:
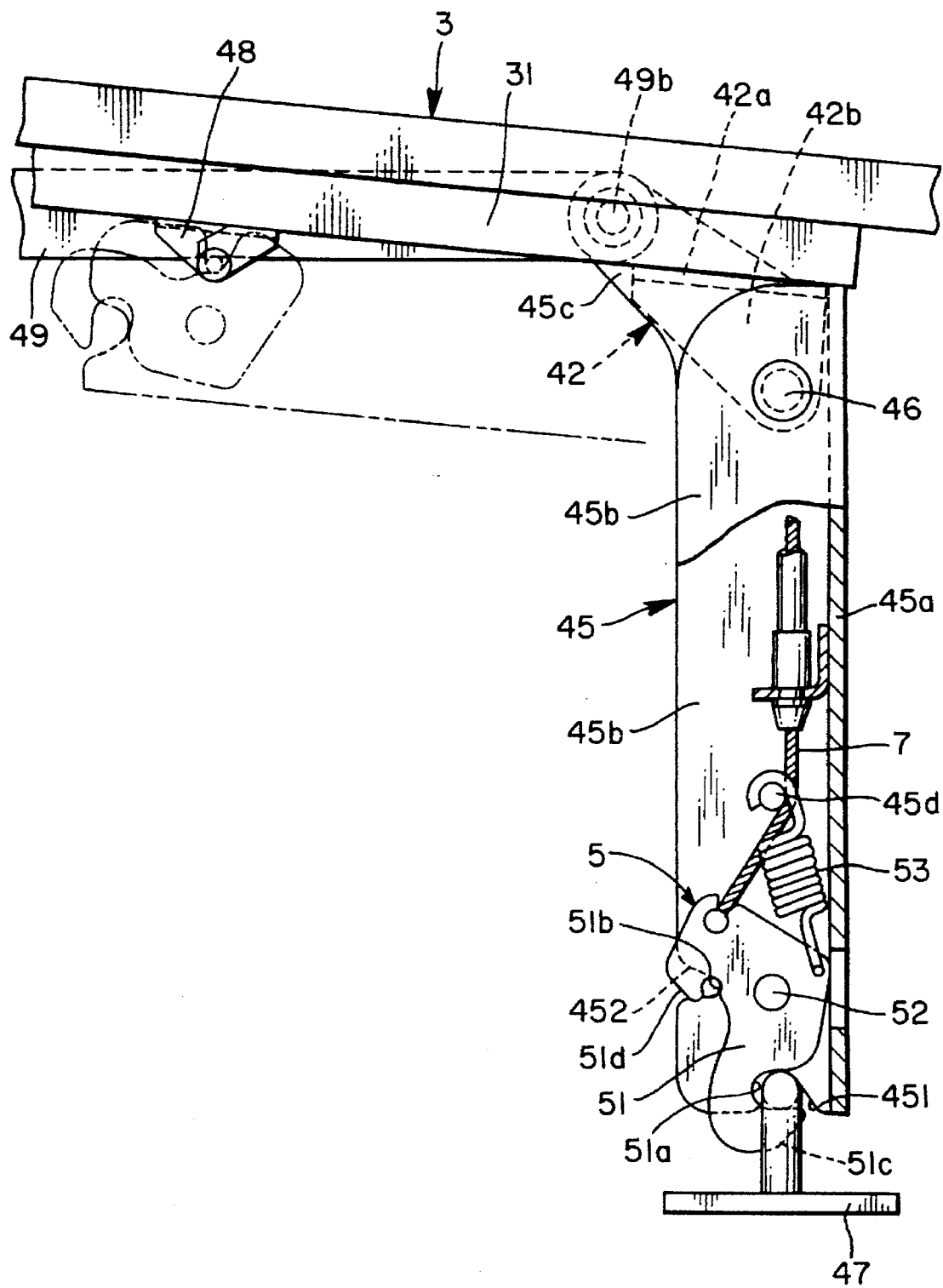
FIG. 2 is an enlarged side view showing a partial enlarged cross section of the main components of the present invention.

As shown in FIG. 1 and FIG. 2, brackets 41 are respectively fixed to front portions of a pair of lower rails 31 of a slide mechanism 3, while brackets 42 are respectively fixed to the rear portions thereof. These brackets 41 and 42 are each given a cross-sectional reverse U shape having lower walls 41a and 42a and a pair of opposing flange walls 41b and 42b extending from both ends of the lower walls 41a and 42a, and fixed to the lower surfaces of the lower rails 31 by the lower walls 41a and 42a. At the location opposite the brackets 41 of the vehicle floor 2, a pair of brackets 43 which have a cross-sectional U shape and a pair of opposing flange walls 43b extending from both ends of lower walls 43a are fixed at these lower walls 43a, while the brackets 41 are rotatably connected to the brackets 43 by pins 44 at the flange walls 41b facing the flange walls 43b. A pair of legs 45 is rotatably supported at the brackets 42. These legs 45 have a cross-sectional reverse C shape and flange walls 45b extending from both edges of side walls 45a, and are rotatably connected by pins 46 at the flange walls 45b facing the flange walls 42b, whereby the legs 45 are rotatably supported by the brackets 43. Also, a first striker 47 and a second striker 48 are fixed at a predetermined location on the vehicle floor 2 and a predetermined location on the lower rails 31. A first notch 451 having an opening at its forward edge and a second notch 452 having an opening at its lower edge are formed in each of the flange walls 45b in the vicinity of the free ends of the leg portions 45.

The brackets 43 and the leg portions 45 are connected via links 49. One end of each link 49 is connected to a flange wall 43b on the inside of a bracket 43 by a pin 49a, and rotatably connected to an arm portion 45c formed in the flange wall 45b on the inside of the leg portion 45 by a pin 49b.

Lock mechanisms 5 are arranged in each of the leg portions 45. Each of the lock mechanisms 5 are formed solely by a latch 51 and spring 53. The latch 51 is attachable/detachable to and from the first striker 47 and the second striker 48, and is rotatably supported in the vicinity of the free end of the leg portions 45 by a pin 52 disposed between the flange walls 45b. In each of these latches 51, a third notch 51a which is intersectable with the first notch 451 of the leg portion 45 and creates an engagement relationship between the first striker 47 and the latch 51 by means of this intersection, and a fourth notch 51b which is intersectable with the second notch 452 of the leg portion 45 and creates an engagement relationship between the first striker 48 and the latch 51 by means of this intersection, are formed. The third notch 51a and fourth notch 51b intersect the first notch 451 and second notch 452 substantially simultaneously due to the rotation of the latch 51, and both open similarly in one rotation direction (counter-clockwise in FIG. 2) of the latch 51. Also, in the latch 51, in the state where the third notch 51a and fourth notch 51b intersect with the first notch 451 and second notch 452, inclined faces 51c and 51d disposed opposite the first notch 451 and second notch 452 so as to abut the first striker 47 and the second striker 48 are formed continuing from the third notch 51a and fourth notch 51b. These inclined faces 51c and 51d are inclined in one rotation direction of the latch 51. A spring 53 is attached between the latch 51 and the leg portion 45 with one end stoppered by the latch 51 and the other end stoppered by the flange wall 45b via a pin 45d, and continuously rotatably urges the latch 51 in one direction.

As shown in FIG. 1, at the rear portion of the seat 1, one handle 6 is rotatably supported and this handle 6 is connected to the latches 51 of each of the lock mechanisms 5 via a cable wire 7.

Note that each of the lock mechanisms 5, as well as having a latch 51 and a spring 53, may also be formed having a pawl which controls rotation of the latch 51. In such a case, the handle 6 is connected to the pawls of each of the lock mechanisms 5 via the cable wire 7.

The operation of the present embodiment will now be explained based on FIG. 2 through FIG. 4.

Figure 3:
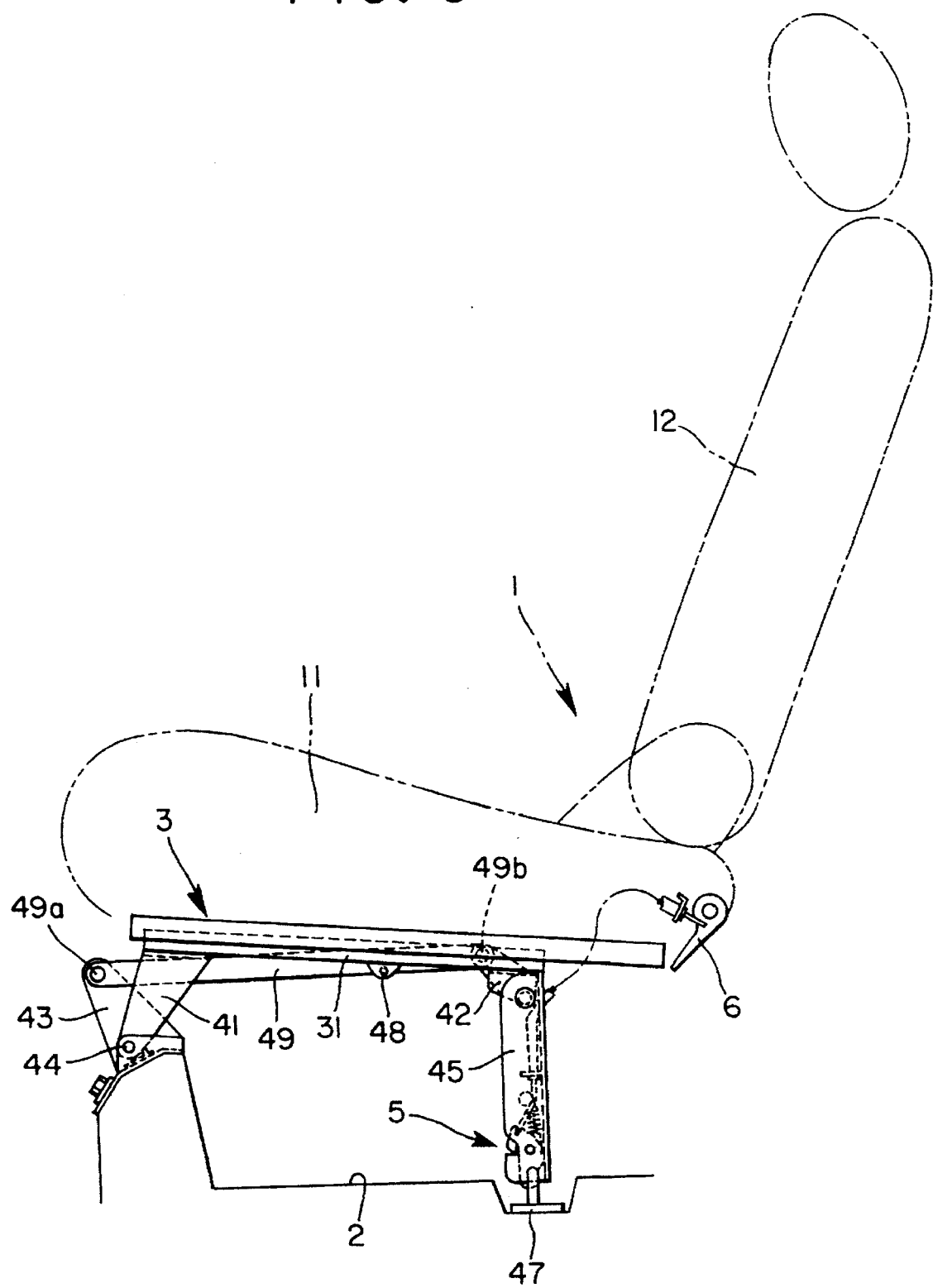
FIG. 3 is a side view showing a seating state of the automobile seat of the present invention.

FIG. 3 shows a seating state. In this seating state, the seat 1 is disposed reclined with respect to the vehicle floor 2 so that the seat cushion 11 is substantially parallel with the vehicle floor 2, and the leg portions 45, as shown by the solid line in FIG. 2, as well as being disposed protruding from the seat 1, are rotation controlled with respect to the seat 1 by the interlocking state of the lock mechanism 5 and the vehicle floor 2 due to engagement of the latch 51 and the first striker 47 created by the intersecting of the first notch 451 and the third notch 51a. Thereby, rotation of the seat 1 with respect to the vehicle floor 2 is controlled centering on the pin 44, and the seat 1 is maintained in the seating state. Note that the seat back 12 is in a raised state at a predetermined angle of inclination with respect to the seat cushion 11 by means of a reclining mechanism.

In this seating state, after the seat back 12 is already in a folded state with respect to the seat cushion 11, the handle 6 is operated, whereupon the latch 51 is rotated in the clockwise direction of FIG. 2 (the other direction to that described previously) against the urging force of the spring 53 via the wire cable 7. Thereby, the first notch 451 and the third notch 51a no longer intersect and engagement of the latch 51 and the first striker 47 is released. As a result, rotation of the leg portions 45 is allowed and the seat 1 becomes rotatable with respect to the vehicle floor 2. In this state, the seat 1 is rotated in the counter-clockwise diretion in FIG. 3 around the pin 44, whereupon as shown in FIG. 4, the seat 1 is disposed so that the seat cushion 11 is upright with respect to the vehicle floor 2 and an upright space-saving state is attained. At this time, the leg portions 45 are rotated in the clockwise direction of FIG. 3 to match the rotation of the seat 1 by means of links 49.

When the seat cushion 11 is fully upright with respect to the vehicle floor 2, the leg portions 45 are disposed housed in the seat 1 as shown by the two-dot broken lines in FIG. 2. At this time, the second striker 48 abuts the inclined face 51d of the latch 51 and enters the second notch 452 and the fourth notch 51b while rotating the latch 51 in the counter-clockwise direction in FIG. 2 against the urging force of the spring 53, and finally engages with the latch 51 due to the intersecting of the second notch 452 and the fourth notch 51b. Thereby, the leg portions 45 are rotation controlled with respect to the seat 1 by the engaged state of the lock mechanism 5 and the seat cushion 11. As a result, the seat 1 is maintained in an upright space-saving state.

Figure 4:
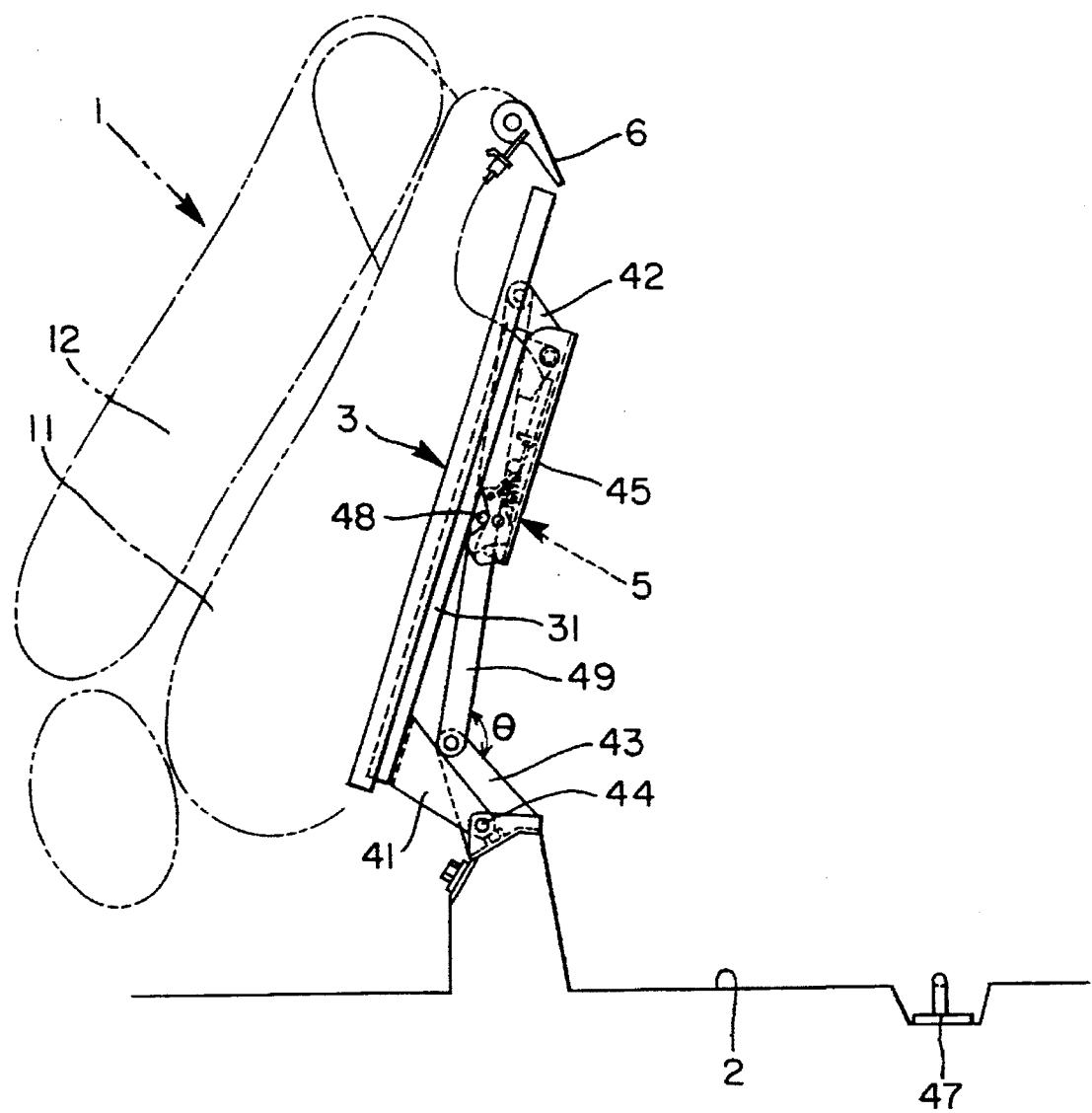
FIG. 4 is a side view showing a folded-up state of the automobile seat of the present invention.

FIG. 4 shows this space-saving state. In this space-saving state, the seat 1 is disposed such that the seat cushion 11 is upright with respect to the vehicle floor 2, and the leg portions 45, as shown by the two-dot broken lines in FIG. 2, as well as being disposed housed in the seat 1, are rotation controlled with respect to the seat 1 by the interlocking state of the lock mechanism 5 and the seat cushion 11 due to engagement of the latch 51 and the second striker 48 created by the intersecting of the second notch 452 and the fourth notch 51b. Thereby, rotation of the seat 1 with respect to the vehicle floor 2 is controlled centering on the pin 44, and the seat 1 is maintained in the space-saving state. Note that the seat back 12 is in a folded-up state with respect to the seat cushion 11 by means of the reclining mechanism.

The tilting angle θ (see FIG. 4) of each leg portion with respect to the bracket (43) is less than 180 degree the bracket (41) is positioned forwardly with respect to the position of the bracket (43) when the seat is folded to provide a large space.

In this space-saving state, when the handle 6 is operated, the latch 51 is rotated in the clockwise diretion (other direction previously described) of FIG. 2 against the urging force of the spring 53 via the wire cable 7. Thereby, the second notch 452 and the fourth notch 51b no longer intersect and engagement of the latch 51 and the second striker 48 is released.

As a result, rotation of the leg portions 45 is allowed and the seat 1 is rotatable with respect to the vehicle floor 2. In this state, the seat 1 is rotated in the clockwise direction in FIG. 4 around the pin 44, whereupon as shown in FIG. 3, the seat 1 is disposed so that the seat cushion 11 is reclined with respect to the vehicle floor 2 and thereafter the seat back 12 attains an upright state with respect to the seat cushion 11, whereupon a space-saving state is reached. At this time, the leg portions 45 are rotated in the counter-clockwise direction of FIG. 4 to match the rotation of the seat 1 by means of links 49.

When the seat cushion 11 is fully reclined with respect to the vehicle floor 2, the leg portions 45 are disposed protruding from the seat 1 as shown by the solid lines in FIG. 2. At this time, the first striker 47 abuts the inclined face 51c of the latch 51 and enters the first notch 451 and the third notch 51a while rotating the latch 51 in the counter-clockwise direction in FIG. 2 against the urging force of the spring 53, and finally engages with the latch 51 due to the intersecting of the first notch 451 and the third notch 51a. Thereby, the leg portions 45 are rotation controlled with respect to the seat 1 by the engaged state of the lock mechanism 5 and the vehicle floor 2. As a result, the seat 1 is maintained in a seating state.

As many apparently widely different embodiments of the present invention can be made without departing from the spirit and scope thereof, it is to be understood that the invention is not limited to the specific embodiments thereof except as defined in the appended claims.

What is claimed is:

1. An automobile seat comprising:
   an axle mechanism disposed between the seat and a floor of the automobile for rotatably supporting the seat on the automobile floor;
   a rotating member rotatably supported in the seat;
   a first lock mechanism disposed in the rotating member and detachable from the automobile floor;
   a linkage mechanism disposed between the automobile floor and the rotating member and interlocking with rotation of the seat with respect to the automobile floor to rotate the rotating member with respect to the seat; and
   a second lock mechanism disposed in the rotating member and engaged with the seat, to render the rotating member non-rotatable with respect to the seat.

2. The automobile seat according to claim 1, said first and second lock mechanism comprising a latch having two notches attachable and detachable to and from a first striker fixed to the automobile floor and a second striker fixed to the seat.

3. An automobile seat comprising:
   a first bracket (41) secured to a front portion of a lower rail (31) and rotatably supported through a pin (44) on a vehicle floor;
   a second bracket (43) fixed to the vehicle floor and having a pin (49a) offset from the pin (44);
   a third bracket (42) supported on a rear portion of the lower rail (31) and suspending a rotatable leg (45) which is engageable with the vehicle floor;
   a link (49) pivoted on the second bracket (43) and the third bracket (42) through the pins (49a, 49b); and
   a hook (48) means secured to the lower rail (31) and engageable with the leg (45) when the seat is folded;
   an included tilting angle (θ) of the link (49) with respect to the second bracket (43) being less than 180 degree when the leg is secured to the lower rail (31) by means of the hook means.

4. The automobile seat according to claim 3, further comprising a latch (51) rotatably supported on the leg (45) and having a pair of hooks (51a, 51b) which are each fitted into a repective notch (451, 452), the latch being engageable with the hook means.

5. The automobile seat according to claim 4, wherein the first bracket (41) is positioned forwardly with respect to the second bracket (43) when the seat is folded and positioned rearwardly with respect to the second bracket (43) when the seat is not folded.

6. The automobile seat according to claim 4, wherein the latch (51) is connected to a handle (6) through a cable (7) and forced in one direction in a normal state by means of a biasing force of a spring (53) fixed at one end to the leg (45).

* * * * *